Oct. 15, 1957     D. C. McDONALD ET AL     2,810,103
MULTIPLE MODE SERVOMECHANISM
Filed Dec. 13, 1954                                      2 Sheets-Sheet 1
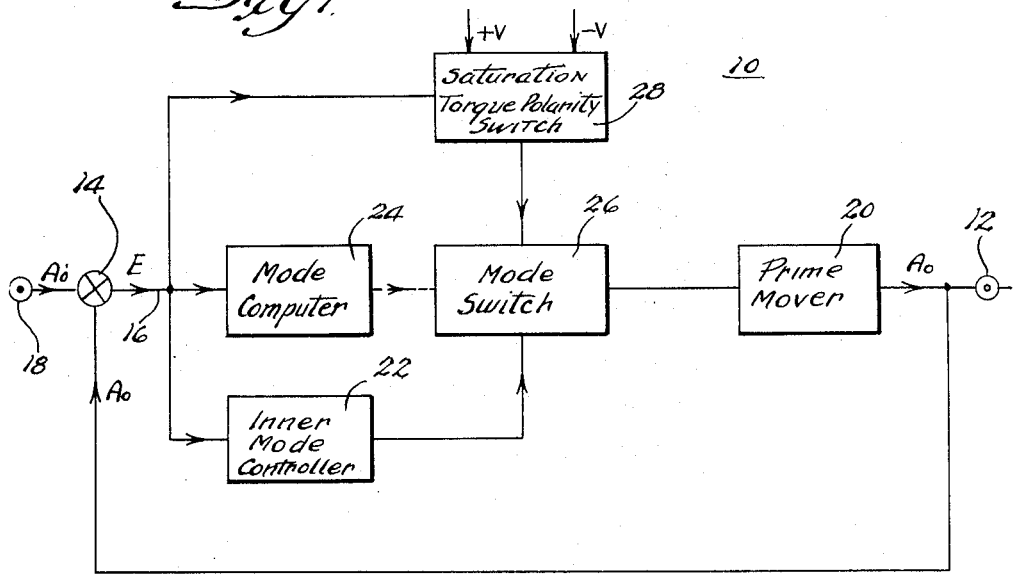
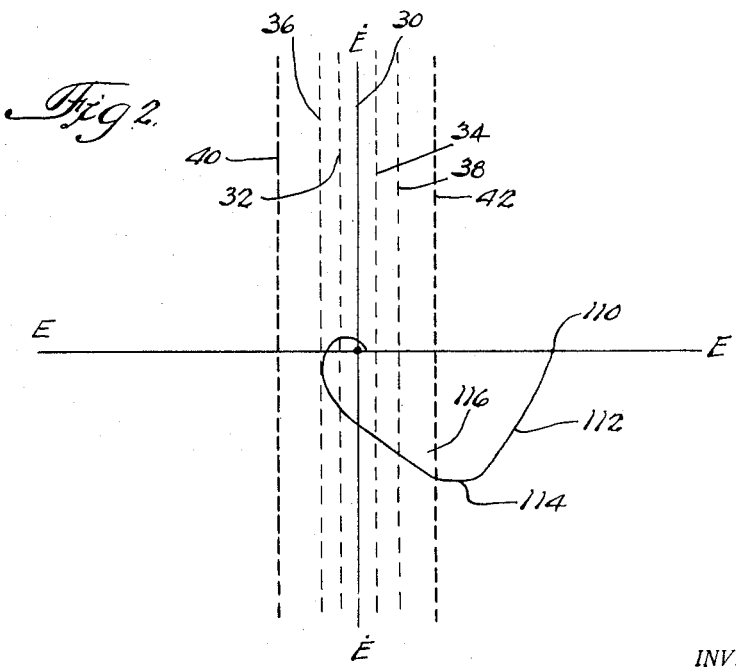
INVENTORS.
Donald C. McDonald
BY & Arnold W. Shutler
Thiess, Olson, Mecklenburger,
von Holst, & Coltman   Attys.

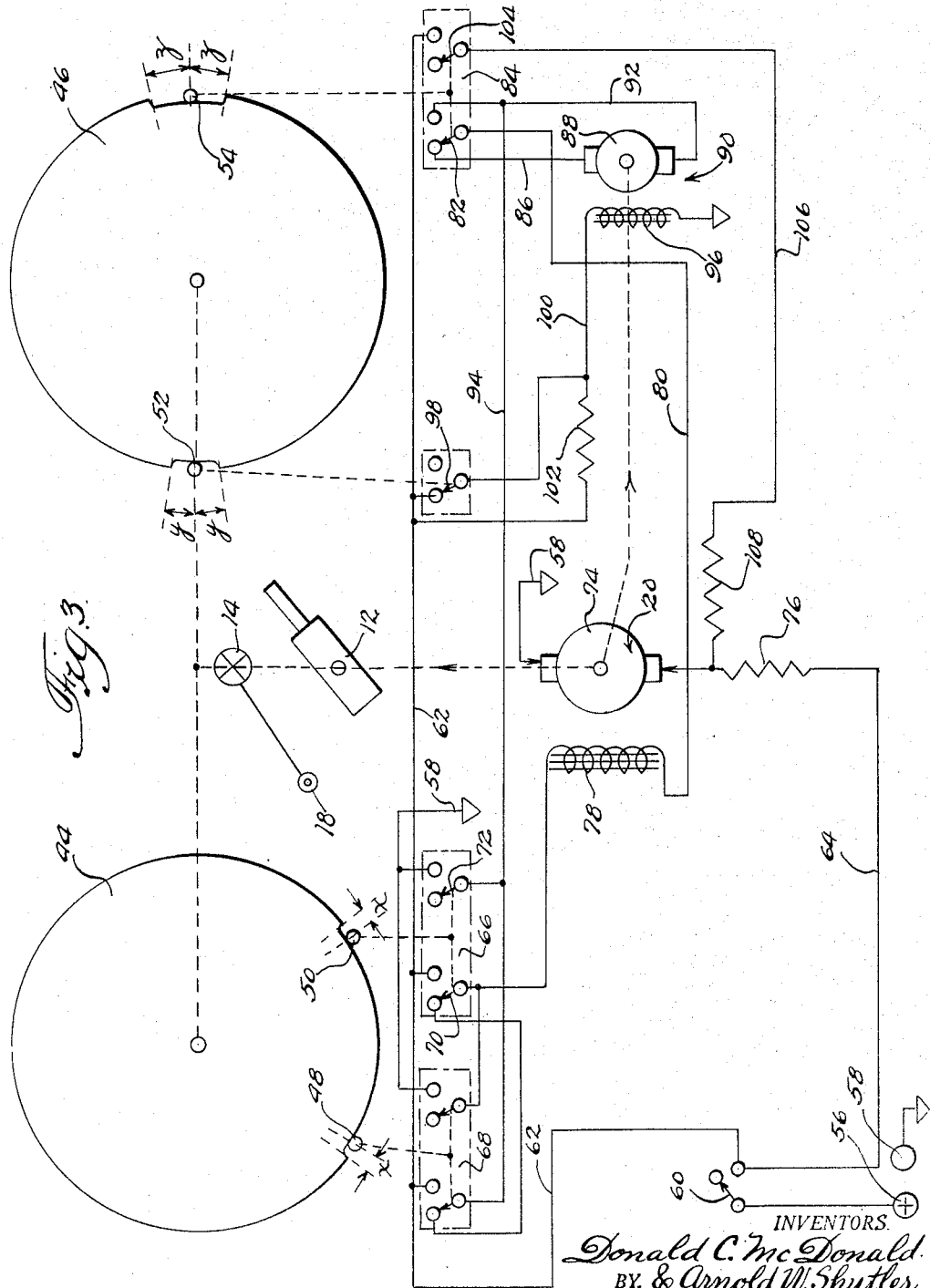

United States Patent Office 2,810,103
Patented Oct. 15, 1957

2,810,103

MULTIPLE MODE SERVOMECHANISM

Donald C. McDonald, Mount Prospect, and Arnold W. Shutler, Lake Bluff, Ill., assignors to Cook Electric Company, Chicago, Ill., a corporation of Illinois Application December 13, 1954, Serial No. 474,650

11 Claims. (Cl. 318—32)

This invention relates to improved servomechanisms and more particularly to an improved multiple mode servomechanism wherein switch means are employed for both mode switching and control purposes within the various modes.

In the growing field of servomechanism research the systems are becoming increasingly complex and powerful. Vacuum tube amplifiers, magnetic amplifiers, potentiometers and the like must be constructed to adequately handle large amounts of power, dissipate large amounts of heat and still withstand the shocks of impact and vibration normally encountered in field use. To construct amplifiers and the like having these characteristics is costly and results in massive control systems. As weight is an important factor in aircraft and vehicular controls, such increases in mass and complexity are highly undesirable. In the copending application of Donald C. McDonald, Ser. No. 287,955, filed on May 15, 1952, now Patent No. 2,777,285, a system of multiple mode operation is disclosed in which the desired accuracy, stability and speed of response are attained for small values of error through the use of linear amplifiers, while for large values of error the amplifiers and control system may be by-passed producing maximum response for large error values while reducing the cost and complexity of the amplifiers and associated equipment.

In a preferred form of the multiple mode system, linear control of the output driving means is provided for small values of error and/or error rate whereby the torque of the output bears a proportional relationship to an integro-differential function of the error, while in the outer mode of operation, that is when there are substantial differences between the position and/or velocity of the output relative to the input, the amplifier which normally produces linear control is by-passed and the full torque of the motive means is utilized. Such a system is believed to produce the optimum characteristics of any servo system having mechanical components of limited capacity. The purpose of additional research in the field of servomechanisms is therefore primarily directed to the simplification of the control equipment and the consequent reduction in the weight and complexity of the entire system.

It is therefore one object of this invention to provide an improved servomechanism capable of producing optimum speed of response and static accuracy with a minimum of overshoot and employing a greatly simplified mechanical system.

It is another object of this invention to provide an improved servomechanism having inherent amplification in the driving means whereby all vacuum tube amplifiers, magnetic amplifiers and the like may be eliminated.

It is still another object of this invention to provide an improved servomechanism having multiple modes of operation.

It is a further object of this invention to provide an improved multiple mode servomechanism in which control within the various modes and transition between the various modes are accomplished by simple switching or other directly actuated control devices.

It is still another object of this invention to provide an improved multiple mode servomechanism in which all control functions are performed by mechanical switch means whereby discontinuous servomechanism operation produces a minimum of overshoot and optimum positional accuracy.

It is still another object of this invention to provide an improved multiple mode servomechanism in which a signal bearing a proportional relationship to the output velocity is employed selectively in the output drive means to produce a plurality of operating modes.

It is another object of this invention to provide an improved multiple mode servomechanism in which a tachometer generator is selectively inserted in the field winding of the driving motor to produce output damping with inherent amplification.

It is a further object of this invention to provide an improved multiple mode servomechanism in which a tachometer generator is selectively utilized to overdamp the system at predetermined times.

It is still another object of this invention to provide an improved servomechanism in which simple cam means and mechanical switches are employed for control and mode switching purposes.

Further and additional objects of this invention will become obvious from a consideration of this description, the accompanying drawings and the appended claims.

In one form of this invention a simple mechanical device requiring no amplifiers or the like is utilized to control a driving motor for positioning a massive load rapidly and accurately in response to the manipulation of a simple hand wheel input. More particularly the hand wheel and load are coupled together through a differential device whereby an error signal is generated which operates a plurality of cam means to actuate various switches for applying corrective force to the load. The corrective forces which are applied to the load vary in accordance with the magnitude of the error and in accordance with the velocity of the output when said velocity is within predetermined ranges.

For a more complete understanding of this invention reference will now be made to the accompanying drawings wherein:

Fig. 1 is a block diagram of one embodiment of this invention;

Fig. 2 is a phase plane diagram of the operation of the embodiment of Fig. 1; and Fig. 3 is a detailed diagrammatic illustration of the components which are included within the various blocks illustrated in Fig. 1.

Referring now to the drawings and more particularly to Fig. 1, a system 10 for the multiple mode control of an output 12 is illustrated. A differential device 14 generates a mechanical displacement, or signal, at output 16 which is proportional to the error or positional differences between the load 12 and an input 18. The input 18 in this embodiment is a hand wheel and the load 12 is a gun which is positioned in elevation by the servomechanism 10, though it will be clear that any input and any load may be used. When the load 12 and input 18 are in positional agreement the servomechanism 10 is quiescent, generating no driving forces in the prime mover 20. However, if, because of manipulation of hand wheel 18 or forces applied to the load 12, a positional difference develops between these two elements, a signal is generated in the differential output 16 which will, through the control components to be described, initiate a correcting force in the prime mover 20 which will drive the load 12 to a position of substantial agreement with the input 18.

As will be explained in greater detail hereinafter small errors will be corrected by an inner mode controller 22 which energizes the prime mover 20 with relatively low power and with a feedback or damping signal. The error signal is opposed by the damping signal bearing a proportional relationship to the velocity of the load 12 whereby overshooting is minimized. Thus, for small errors, a low power correcting force and substantial output damping are employed to bring the load into positional agreement with the input 18.

For errors of substantial magnitude, it is desirable to provide large correcting forces to eliminate the errors as quickly as possible with a system of limited torque. To do this, it is desirable to apply voltages to the prime mover 20 which will provide the maximum output torque for which the motor is designed. It is also desirable that a minimum amount of damping is employed whereby the system will approach zero error in the shortest possible time, though a tendency is thereby produced to overshoot the zero error position. A mode computer 24 is provided to sense the magnitude of the positional differences or error as indicated by the differential output 16. When this error exceeds a predetermined maximum, the mode computer actuates a mode switch 26 which removes the output of inner mode controller 22 from the prime mover 20 and applies a fixed voltage to the prime mover from the saturation torque polarity switch 28.

As it is desirable for satisfactory operation that the full saturation torque of the prime mover be applied to the load in the appropriate direction to reduce the error toward zero, it is necessary that the polarity of the voltage applied to the field of the prime mover relative to that applied to the armature thereof be such as will produce the desired direction of rotation. The saturation torque polarity switch 28 senses the polarity of the error as indicated at differential output 16 and thus controls the polarity of the voltage applied to the field of prime mover 20 through mode switch 26.

Fig. 2 is a phase plane diagram illustrating the operation of the system of Fig. 1. In the diagram of Fig. 2 values of error E are plotted along the abscissa and values of error rate Ė are plotted along the ordinate. The mode boundaries and control values employed in the described embodiment are all functions of error alone and are therefore straight vertical lines in the phase plane diagram. The system described possesses complete bilateral symmetry whereby all values and boundaries to the right of the Ė axis 30 are precisely duplicated to the left of that axis. A pair of vertical lines 32 and 34 disposed on either side of and parallel to the Ė axis define the limits of accuracy of the system. That is, errors of no greater magnitude than those within the boundaries 32 and 34 are tolerable and no correcting forces will be applied to the system when the error of the system is within these limits. A second pair of vertical boundaries 36 and 38 define a control region within the inner mode in which the amount of output damping is of a substantial magnitude. When the error exceeds the limits of the boundaries 36 and 38 the output damping provided by inner mode control 22 is reduced whereby the torque of prime mover 20 is increased. The mode boundaries 40 and 42 define the limits of inner mode operation. Whenever the error exceeds the mode boundaries 40 or 42 the mode computer 24 senses the transition beyond the boundaries 40 and 42 and actuates the mode switch 26, removing the output of inner mode controller 22 from the prime mover 20 and applying the output of saturation torque polarity switch 28 thereto. In this particular embodiment the saturation torque polarity switch 28 is actuated by the same control means which actuates the inner mode controller 22 and thus the Ė axis 30 is also the torque reversal curve for the outer mode.

The details of the various components of the system of Fig. 1 are illustrated in Fig. 3.

The input hand wheel 18, differential 14 and load 12 are diagrammatically illustrated in Fig. 3 in a manner similar to the showing in Fig. 1. However, the output of differential 14, as shown here, comprises two coaxially mounted cams 44 and 46 having a plurality of cam followers associated therewith. The cam 44 and the associated cam followers 48 and 50 perform the dual function of inner mode control and saturation torque polarity reversal. The cam follower 52 associated with cam 46 controls a switch for the reduction of output damping with increasing values of error, and the cam follower 54 in association with cam 46 controls a switch which removes the output damping from the drive motor and also increases armature excitation of the drive motor.

To best understand the structure of Fig. 3, operation of the controller in the various modes will be described in detail. A source of direct current energy having a positive terminal 56 and a ground 58 provides the entire excitation for the system. The positive voltage is applied through on-off switch 60 to a control bus 62 and an armature bus 64. If an error is indicated by the output of differential 14 the cam 44 is rotated and whenever this rotation becomes sufficient to raise one of the cam followers 48 or 50 the associated switch is actuated. This error is represented by ordinates 32 and 34 in Fig. 2. As is clear from the drawing, clockwise rotation of cam 44 will actuate switch 66 through cam follower 50.

As the system of this invention is completely bilateral, operation will be discussed only with respect to a clockwise displacement of cams 44 and 46. When the displacement thereof exceeds the predetermined error $x$, which is the tolerable error, switch arms 70 and 72 forming a part of switch 66 are moved to the actuated position. In that position the motor 20 is energized to reduce the error by driving the load 12 in such a manner that the cam 44 is driven in a counterclockwise direction. The main switch 60 is closed whenever the system is in use, energizing the armature 74 of motor 20 through a circuit which may be traced from the positive terminal 56 through the run-off switch 60, armature bus 64, armature current limiting resistor 76 and armature winding 74 to ground. When an error is sensed the field circuit of the motor 20 is also completed from the positive terminal 56 through switch 60, control bus 62, switch arm 70, field winding 78, conductor 80, switch arm 82 of mode switch 84, conductor 86, the armature winding 88 of tachometer generator 90, conductor 92, conductor 94 and actuated switch arm 72 to ground 58. Thus, the armature and field windings of motor 20 are energized to produce a correcting torque to eliminate the error.

As the speed of motor 20 increases, the speed of tachometer generator 90 will also increase and will thus generate a voltage in opposition to the applied voltage at terminal 56. The output of tachometer generator winding 88 constitutes damping in the field circuit of motor 20 to reduce the overshoot and hunting of the system when it is operating in the inner mode or is returning to the inner mode. When a counterclockwise rotation of cam 44 raises follower 48, switch 68 completes the above described circuit differing therefrom only in that the terminal connections are reversed, whereby the motor 20 is driven in the opposite direction. Resistor 76 is provided in this circuit to limit the current in the armature winding 74 when the motor is stalled or at rest. The field winding 96 of tachometer generator 90 is energized from the main bus 62 through switch 98 and conductor 100.

Upon the indication of a greater error than that necessary to raise cam follower 50, cam 46 will engage follower 52 to effect actuation of switch 98. This function will be performed for errors within the inner mode of operation, that is when inner mode controller 22 is still functioning to operate the prime mover 20. The error values which will operate follower 52 are represented by ordinates 36 and 38 in Fig. 2. When switch 98 is opened, a resistor 102 is inserted in the field winding circuit of tachometer generator 90 and the field winding circuit may then be traced from bus 62 through resistor 102, conductor 100 and field winding 96 to ground. The purpose of the insertion of resistor 102 is to reduce the output damping provided by tachometer generator 90 whereby quicker response is provided in the outer portion of the inner mode. A second advantage in employing the resistor 102 is the reduction in arcing when the tachometer generator 90 is removed from the field circuit of motor 20 upon entering the outer mode.

Outer mode operation of the embodiment of Fig. 3 occurs whenever cam follower 54 is raised indicating an error greater than that determined by the ordinates 40 and 42 of Fig. 2. The saturation torque polarity is determined by the cam 44 while the transition to the outer mode is determined by cam 46 and the associated cam follower 54 which actuates switch 84. Whenever mode switch 84 is actuated, the tachometer generator 90 is removed from the field circuit of motor 20 and the resistance of the armature circuit thereof is substantially reduced. This switching operation substantially increases the available torque of motor 20 and also eliminates all output damping in the field winding thereof. The circuits which are established in outer mode operation are as follows: The field winding circuit for a clockwise error of sufficient magnitude to require outer mode operation is from terminal 56, through switch 60, main bus 62, switch arm 70, field winding 78, conductor 80, mode switch 82, conductor 94 and switch arm 72 to ground 58. As described above, if the error were of opposite polarity the switch 68 would merely reverse the terminal connections providing opposite excitation for field winding 78. The armature circuit for motor 20 is from terminal 56 through switch 60, main bus 62, actuated load switch arm 104, conductor 106, resistor 108 and armature winding 74 to ground 58. At the same time a parallel path for armature excitation is established from terminal 56 through switch 60, conductor 64, resistor 76 and armature winding 74 to ground 58. However, the value of resistor 108 is generally much smaller than that of resistor 76 rendering the first described armature path the one of importance in outer mode operation. In many embodiments it may be desirable to omit the resistor 108 entirely providing direct full voltage excitation for the armature winding 74.

From the above description, the various modes of operation and the corresponding physical structure of Fig. 3 utilized to accomplish these modes will be clear. Assuming that the hand wheel 18 is initially rotated to establish a large step function of error, the system will be at the point 110 in the phase plane diagram. This represents a positive error E which will excite the motor to produce negative rotation to eliminate the error. As the point 110 is in the outer mode, both cam followers 52 and 54 will be raised, actuating the associated switches 98 and 84. Thus, the full torque of the motor is applied to the load causing a rapid negative increase in velocity Ė and a simultaneous reduction in error E. This is to the load causing a rapid negative increase in velocity represented by curve 112. The impedance of the armature circuit establishes a maximum velocity for the system and when this is reached a constant velocity with decreasing error is represented by the horizontal portion 114 of the curve. Upon entering the inner mode by crossing the boundary 42, limited output damping is inserted in the motor field circuit to oppose the terminal voltage 56 and thus immediaely effect a reduction in the velocity of the motor 20. This is represented by a curved portion 116 of the phase plane diagram. Upon crossing the vertical line 38 the switch 98 is deactuated, consequently removing the resistor 102 from the field winding of tachometer generator 90 to introduce additional damping feedback. This will effect a further reduction in the velocity of the output, thus slowing the motor and load as the error value approaches zero. This is a highly desirable characteristic in servo systems as the overshoot and hunting are thereby substantially reduced. The output damping will be substantial, preferably greater than the critical value, whereby there is an effective torque reversal within the inner mode.

The limit of accuracy of the system as established by vertical line 34 determines the point at which the switch 66 is deactuated. At this point the terminal voltage 56 is removed from the motor 20 but the tachometer generator 90 remains in the field circuit whereby the output damping continues to oppose the motion of motor 20. This circuit may be traced from field winding 78 through switch arm 70, switch 68, conductor 94, conductor 92, armature winding 88, mode switch arm 82 and conductor 80 to the opposite terminal of field winding 78. This latter circuit not only provides output damping as the system is approaching the zero error value, but also will oppose any changes in the position of the load as a result of wind effects, gravity or any external mechanical forces.

While one particular mechanical arrangement is herein described it is believed clear that a system of multiple mode servomechanism operation is disclosed herein in which no external vacuum tube amplifiers or the like are required. For example, while contactor operation is described in the inner mode, a linear potentiometer may be substituted therefor without departing from the invention. Furthermore, while the description and phase plane diagram indicate that the motor reaches its maximum velocity in the described exemplary operation, the controller will function in the same manner in the outer mode without including a period of maximum velocity operation. Also, while one particular method of producing output damping is described, any source of damping signal may be substituted therefor. If the inherent damping of the system is of substantial magnitude, satisfactory operation with only slight overshoot may be attained without the addition of any synthesized damping signal whatsoever. Thus a system is produced which is extremely rugged and simple, while still possessing the advantages of accuracy and speed of response which characterize the multiple mode systems described in the above identified application.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. A position control system comprising an output motor means, position controlling means, means for sensing the difference between the instantaneous positions of said motor means and said controlling means, switch means actuated by said sensing means to energize said motor means to reduce said difference, and means to provide a signal to said motor means bearing a proportional relationship to the velocity of said motor means to oppose the motion thereof whenever said difference is less than a predetermined maximum.

2. A position control system comprising an output motor having an armature and field means, position controlling means, means for sensing the difference between the instantaneous positions of said motor means and said controlling means, means actuated by said sensing means to energize said field means to reduce said difference, and means to provide a signal to said field means bearing a proportional relationship to the velocity of said motor means to oppose the motion thereof whenever said difference is less than a predetermined maximum.

3. A position control system comprising an output motor having an armature and field means, position controlling means, means for sensing the difference between the instantaneous positions of said motor means and said controlling means, means actuated by said sensing means to energize said field means to reduce said difference, damping means to provide a signal to said field means bearing a proportional relationship to the velocity of said motor means to oppose the motion thereof, and switch means to apply said damping means to said field means whenever said difference is less than a predetermined maximum.

4. A position control system comprising an output motor having an armature and field means, position controlling means, means for sensing the difference between the instantaneous positions of said motor means and said controlling means, means actuated by said sensing means to energize said field means to reduce said difference, tachometer generator damping means driven by said motor means to provide a signal to said field means bearing a proportionate relationship to the velocity of said motor means to oppose the motion thereof, and switch means to apply said damping means to said field means whenever said difference is less than a predetermined maximum.

5. A position control system comprising an output motor having an armature and field means, position controlling means, means for sensing the difference between the instantaneous positions of said motor means and said controlling means, means actuated by said sensing means to energize said field means to reduce said difference, damping means to provide a signal to said field means bearing a proportional relationship to the velocity of said motor means to oppose the motion thereof, switch means to apply said damping means to said field means whenever said difference is less than a predetermined maximum, and resistance means inserted in circuit with said armature for values of said difference less than a predetermined maximum.

6. A position control system operated from a source of electric power comprising a bilateral output motor having an armature and field means, position controlling means, means for sensing the difference between the instantaneous positions of said motor means and said controlling means, circuit means to apply said source of electric power to said armature, bidirectional switch means actuated by said sensing means to apply said source to said field means to reduce said difference, damping means to provide a signal to said field means bearing a proportional relationship to the velocity of said motor means to oppose the motion thereof, switch means to apply said damping means to said field means whenever said difference is less than a predetermined maximum, and resistance means inserted in circuit with said armature for values of said difference less than a predetermined maximum.

7. A position control system operated from a source of electric power comprising a bilateral output motor having an armature and field means, position controlling means, means for sensing the difference between the instantaneous positions of said motor means and said controlling means, circuit means to apply said source of electric power to said armature, bidirectional switch means actuated by said sensing means to apply said source to said field means to reduce said difference, tachometer generator damping means driven by said motor means to provide a signal to said field means bearing a proportionate relationship to the velocity of said motor means to oppose the motion thereof, and switch means to apply said damping means to said field means whenever said difference is less than a predetermined maximum.

8. A position control system operated from a source of electric power comprising a bilateral output motor having an armature and field means, position controlling means, means for sensing the difference between the instantaneous positions of said motor means and said controlling means, circuit means to apply said source of electric power to said armature, bidirectional switch means actuated by said sensing means to apply said source to said field means to reduce said difference, tachometer generator damping means driven by said motor means to provide a signal to said field means bearing a proportionate relationship to the velocity of said motor means to oppose the motion thereof, means to reduce the output of said damping means whenever said difference is greater than a predetermined value, and switch means to apply said damping means to said field means whenever said difference is less than a predetermined maximum.

9. A position control system operated from a source of electric power comprising a bilateral output motor having an armature and field means, position controlling means, means for sensing the difference between the instantaneous positions of said motor means and said controlling means, circuit means to apply said source of electric power to said armature, bidirectional switch means actuated by said sensing means to apply said source to said field means to reduce said difference, tachometer generator damping means driven by said motor means to provide a signal to said field means bearing a proportionate relationship to the velocity of said motor means to oppose the motion thereof, means to reduce the output of said damping means whenever said difference is greater than a predetermined value, and switch means to apply said damping means to said field means whenever said difference is less than a predetermined maximum which is greater than said predetermined value.

10. A position control system operated from a source of electric power comprising a bilateral output motor having an armature and field means, position controlling means, means for sensing the difference between the instantaneous positions of said motor means and said controlling means, circuit means to apply said source of electric power to said armature, bidirectional switch means actuated by said sensing means to apply said source to said field means to reduce said difference, tachometer generator damping means driven by said motor means to provide a signal to said field means bearing a proportionate relationship to the velocity of said motor means to oppose the motion thereof, means to reduce the output of said damping means whenever said difference is greater than a predetermined value, switch means to apply said damping means to said field means whenever said difference is less than a predetermined maximum, and resistance means inserted in circuit with said armature for values of said difference less than said predetermined maximum.

11. A position control system operated from a source of electric power comprising a bilateral output motor having an armature and field means, position controlling means, means for sensing the difference between the instantaneous positions of said motor means and said controlling means, circuit means to apply said source of electric power to said armature, bidirectional switch means actuated by said sensing means to apply said source to said field means to reduce said difference, tachometer generator damping means driven by said motor means to provide a signal to said field means bearing a proportionate relationship to the velocity of said motor means to oppose the motion thereof, means to reduce the output of said damping means whenever said difference is greater than a predetermined value, switch means to apply said damping means to said field means whenever said difference is less than a predetermined maximum, resistance means, and switch means to insert said resistance means in circuit with said armature for values of said difference less than said predetermined maximum.

References Cited in the file of this patent

UNITED STATES PATENTS

| | | |
|---|---|---|
| 2,115,086 | Riggs | Apr. 26, 1938 |
| 2,457,792 | Wild et al. | Dec. 28, 1948 |
| 2,661,449 | Gille | Dec. 1, 1953 |
| 2,701,328 | Woodruff | Feb. 1, 1955 |